US012749408B2

(12) United States Patent
Bold

(10) Patent No.: US 12,749,408 B2
(45) Date of Patent: Sep. 29, 2026

(54) LIGHT SIGNAL DIGITAL ENHANCEMENT FOR WIDENING POOL OF POTENTIAL PILOTS

(71) Applicant: The Boeing Company, Arlington, VA (US)

(72) Inventor: Jason Bold, Gainesville, VA (US)

(73) Assignee: THE BOEING COMPANY, Arlington, VA (US)

( * ) Notice: Subject to any disclaimer, the term of this patent is extended or adjusted under 35 U.S.C. 154(b) by 176 days.

(21) Appl. No.: 18/604,271

(22) Filed: Mar. 13, 2024

(65) Prior Publication Data

US 2025/0292689 A1 Sep. 18, 2025

(51) Int. Cl.

| | |
|---|---|
| ***G08G 5/21*** | (2025.01) |
| ***G06F 3/14*** | (2006.01) |
| ***G06T 7/90*** | (2017.01) |
| ***G08G 5/26*** | (2025.01) |

(52) U.S. Cl.

CPC ................. *G08G 5/21* (2025.01); *G06F 3/14* (2013.01); *G06T 7/90* (2017.01); *G08G 5/26* (2025.01); *G06T 2207/10024* (2013.01); *G06T 2207/10032* (2013.01)

(58) Field of Classification Search

CPC .. G08G 5/21; G08G 5/26; G09G 5/02; G09G 5/06; G09G 5/10; G09G 5/028; G09G 5/30; G09G 2320/0666; G09G 2320/0271; G09G 2320/0276; G06T 11/001; G06T 2207/10024; G06T 2207/10032; G06T 2200/24; G06T 25/00–5/08; G06T 15/50; G06T 15/506

See application file for complete search history.

(56) References Cited

U.S. PATENT DOCUMENTS

| | | | |
|---|---|---|---|
| 1,052,849 A | 2/1913 | Schloemilch et al. | |
| 5,917,573 A | 6/1999 | Davis | |
| 6,636,786 B2 | 10/2003 | Partel | |
| 8,444,264 B1 | 5/2013 | Kross et al. | |

(Continued)

FOREIGN PATENT DOCUMENTS

| | | | |
|---|---|---|---|
| CN | 110335486 A | 10/2019 | |
| CN | 112124614 A * | 12/2020 | ............ F21V 13/045 |

(Continued)

OTHER PUBLICATIONS

OPTICA Technical Group (Committee consists of IMAI, Francisco, et al.), Color Technical Group Webinar, "Quality Assessment for Passive Aids in Color Vision Deficiency Subsets," Jun. 16, 2023, 34 pages.

*Primary Examiner* — Wesner Sajous

(74) *Attorney, Agent, or Firm* — MH2 Technology Law Group LLP

(57) ABSTRACT

A detection system for detecting one or more air traffic control (ATC) light gun signals produced by an ATC light gun is provided. The detection system includes an interface subsystem operable to receive one or more ATC light gun signals from at least one camera; a controller operable to command a display unit to communicate information on a display; and a comparison module operable to generate the information in response to detecting data within the signal corresponding to visible light emitted in at least one predetermined frequency range.

20 Claims, 6 Drawing Sheets

(56) References Cited

U.S. PATENT DOCUMENTS

| | | | | |
|---|---|---|---|---|
| 8,941,678 | B2 | 1/2015 | Kurtz et al. | |
| 9,373,046 | B2 | 6/2016 | Nelson | |
| 10,377,304 | B2 | 8/2019 | Chan et al. | |
| 10,423,844 | B2 | 9/2019 | Dai et al. | |
| 10,565,872 | B2 | 2/2020 | Chan et al. | |
| 10,657,677 | B2 | 5/2020 | Chan et al. | |
| 11,398,864 | B2 | 7/2022 | Donley et al. | |
| 11,587,314 | B2 | 2/2023 | Kale | |
| 2011/0196598 | A1* | 8/2011 | Feyereisen | G01C 23/00 701/120 |
| 2011/0229023 | A1 | 9/2011 | Jone et al. | |
| 2012/0147163 | A1 | 6/2012 | Kaminsky | |
| 2015/0284995 | A1* | 10/2015 | Voges | E06B 9/40 160/311 |
| 2015/0287345 | A1 | 10/2015 | Tanuwidjaja | |
| 2018/0286233 | A1 | 10/2018 | Suzuki et al. | |
| 2021/0118194 | A1 | 4/2021 | Lee et al. | |
| 2021/0132634 | A1* | 5/2021 | Groden | B64C 27/57 |
| 2022/0215759 | A1 | 7/2022 | Edwards | |
| 2023/0084419 | A1* | 3/2023 | Tellechea | G08G 5/54 701/16 |
| 2023/0134226 | A1 | 5/2023 | Souche et al. | |
| 2024/0383614 | A1* | 11/2024 | Tellechea | G08G 5/74 |

FOREIGN PATENT DOCUMENTS

| | | | | |
|---|---|---|---|---|
| WO | 2010/115020 | A2 | 10/2010 | |
| WO | 2023/096713 | A1 | 6/2023 | |
| WO | WO-2023197302 | A1 * | 10/2023 | G08G 1/04 |

* cited by examiner

ATC LIGHT GUN SIGNALS FOR AIRCRAFT

| COLOR & TYPE | GROUND | AIR |
|---|---|---|
| STEADY GREEN | Cleared for takeoff | Cleared to land |
| FLASHING GREEN | Cleared for taxi | Return for landing (to be followed by steady green) |
| STEADY RED | STOP! | Give way to other aircraft and continue circling |
| FLASHING RED | Taxi clear of runway in use | Airport unsafe, do not land |
| FLASHING WHITE | Return to starting point on airport | N/A |
| ALTERNATING RED/GREEN | Excercise extreme caution | |

FIG. 5

LIGHT SIGNAL DIGITAL ENHANCEMENT FOR WIDENING POOL OF POTENTIAL PILOTS

FIELD

The present disclosure relates to a detection system, and more particularly, to a detection system situated in an aerial vehicle for the detection of air-traffic control (ATC) light gun signals.

BACKGROUND

Pilots need to identify different colors to fly successfully. Therefore, pilots are tested for their color perception when they see an Aviation Medical Examiner (AME) for a medical certificate. Color blindness testing may be administered by the AME. If a pilot fails that test, other color vision tests may be given including operational tests with the FAA to prove that the pilot can perceive different colors while flying. Some pilots may suffer to some extent from color blindness, such that the pilot has difficulty or is unable to observe one or more colors or combinations. For instance, a pilot may not be able to detect certain colors presented to the pilot during operation of the aerial vehicle. The pilot therefore may have difficulty interpreting ATC light gun signals and other devices during operation of the aerial vehicle. In some instances, the pilot may be restricted or prevented from flying in certain circumstances.

The Federal Aviation Administration (FAA) wants to make sure that pilots can clearly and easily identify different colored lights. For example, when flying night approaches, pilots must identify white, green, red, yellow, and blue lights. Visual Approach Slope Indicator (VASI)/Precison Approach Path Indicator (PAPI) lights or airport beacons require the pilot to differentiate the color of a light in absence of any other clue. This is unlike driving a car, where street light designs clue you into the color by the position on the traffic light. Further, airport lights are often tiny specks of light far away. A pilot with color deficiency will have a difficult time differentiating these faint clues. It is also worth noting that these deficiencies become much harder to deal with in difficult conditions, such as when fatigue plays a role. Identifying different colored lights helps pilots identify the correct runways and taxiways. Pilots must also identify approach lights and Instrument Landing System (ILS) lights for instrument approaches. And, of course, they should be able to see different colored lights in the cockpit and read charts that use magenta, green, and blue shading.

A pilot that misinterprets lights while flying an approach at night could endanger the safety of their crew, passengers, and people on the ground. The FAA is focused on safety and wants to ensure that pilots can perceive different colors used in aviation operations. Color blindness rules were given a fresh review following an accident involving a FedEx 727 in 2002. The color deficient first officer, flying a night approach into Tallahassee Regional Airport, sank below the glide path on a visual approach. The aircraft crashed one half-mile short of the runway into trees and broke apart. The first officer's inability to interpret the VASI lights on the night approach was cited as one probable cause in the NTSB's accident report. According to AOPA, about 0.5 percent of women and eight percent of men have difficulty with color perception. Most color perception difficulties arise from deciphering between red and green.

ATC uses the following procedures in the control of aircraft, ground vehicles, equipment, and personnel not equipped with radio. These same procedures are used to control aircraft, ground vehicles, equipment, and personnel equipped with radio if radio contact cannot be established. ATC personnel use a directive traffic control signal which emits an intense narrow light beam of a selected color (either red, white, or green) when controlling traffic by light signals. Traffic signal lights offer an advantage that some control may be exercised over nonradio equipped aircraft. Pilots of departing aircraft should communicate with the control tower on the appropriate ground control/clearance delivery frequency prior to starting engines to receive engine start time, taxi and/or clearance information. Unless otherwise advised by the tower, the pilot is to remain on that frequency during taxiing and runup, then change to local control frequency when ready to request takeoff clearance. The directions transmitted by a light signal are very limited since only approval or disapproval of a pilot's anticipated actions may be transmitted. No supplement or explanatory information may be transmitted except by the use of the "General Warning Signal" which advises the pilot to be on the alert. Between sunset and sunrise, a pilot wishing to attract the attention of the control tower should turn on a landing light and taxi the aircraft into a position, clear of the active runway, so that light is visible to the tower. The landing light should remain on until appropriate signals are received from the tower. During daylight hours, the pilot acknowledges tower transmissions or light signals by moving the ailerons or rudder. At night, acknowledgement is made by blinking the landing or navigation lights. If radio malfunction occurs after departing the parking area, the pilot watches the tower for light signals or monitors tower frequency.

ATCs use a signal lamp (called a "signal light gun" or "light gun" by the FAA) to communicate instructions to non-radio aircraft, ground vehicles, and people on the ground within the airfield perimeter. The signals are an essential means of reaching aircraft that do not have radios installed or that are experiencing a radio failure. They may also come into play if ATC radio equipment fails. Light gun signals emit a bright light visible from great distances, allowing a controller to issue instructions or warnings to a pilot. The signal may be transmitted using a handheld directional lamp operated by an ATC in the tower or on the apron, or it may be from a beacon fixed to the tower. The ATC light gun signals include a red light, a green light, and white light. Aircraft on the ground and in the air will interpret these signals differently depending on whether they are steady or flashing.

The ATC light gun signals include the following light states. The first ATC light gun state is a steady red light gun signal. In this state, a pilot in flight should give way to other aircraft and keep circling after spotting this signal. When continuing to land would not be safe for some reason, ATC often sends this signal.

The second ATC light gun state is a flashing red light gun signal. A flashing red signal from the control tower indicates that landing is risky for an aircraft in the air.

The third ATC light gun state is a steady green light gun signal. A steady green light directed at aircraft in the air confirms it is safe to land. This signal means the runway is clear, and you can land on it.

The fourth ATC light gun state is a flashing green light gun signal, which denotes that landing is safe if it is visible. A flashing green light on the ground signals that it is safe for the plane to taxi.

The fifth ATC light gun state is a flashing white light gun signal. A flashing white light on an airplane in the air has no significance under Federal Aviation Administration standards. An airplane should land at the airfield and proceed to the apron if the white light is flashing, according to International Civil Aviation Organization regulations. It is not, however, permission to land or taxi. The continuous green and flashing green signals that should appear after this instruction should be seen by the pilot. A flashing white light alerts ground-based vehicles, aircraft, and people to return to the airfield's starting location.

The sixth ATC light gun state is an alternating red and green light signal. A pilot who sees alternating red and green lights in the vicinity of an airfield should exercise extreme caution. ATC uses this combination as a general warning signal, which usually indicates a serious problem on the airfield or within its airspace. Accordingly, ATC may follow this signal with another one.

Thus, there is a need to increase the number of pilots that are qualified to fly in a variety of environments by reducing or eliminating the current restrictions imposed on partially or completely color-blind pilots.

SUMMARY

According to examples of the present disclosure, a detection system for an aerial vehicle operation is disclosed. The detection system comprises at least one detector operable to receive and detect one or more ATC light gun signals emitted from an ATC light gun; a display unit operable to communicate information on a display; and a controller, coupled to the at least one camera and the display unit, and configured to command the display unit to communicate the information in response to detecting data within the one or more ATC light gun signals that is received and detected corresponding to visible light emitted in at least one predetermined frequency range.

According to examples of the present disclosure, a controller is disclosed that comprises an interface subsystem operable to receive an image based on one or more ATC light gun signals received and detected from at least one camera and a command subsystem operable to command a display unit to communicate information on a display. A comparison module is operable to generate the information in response to detecting data within the image corresponding to visible light emitted in at least one predetermined frequency range.

According to examples of the present disclosure, a method of detecting one or more ATC light gun signals is disclosed. The method comprises receiving one or more ATC light gun signals by at least one camera, detecting data within the ATC light gun signals that is received corresponding to visible light emitted in at least one predetermined frequency range, and commanding a display unit to communicate information onto a display in response to detecting the data.

According to examples of the present disclosure, a non-transitory computer readable medium that stores instructions that when executed by a hardware processor performs a method for detecting one or more air traffic control (ATC) light gun signals produced by an ATC light gun is disclosed. The method comprises receiving one or more ATC light gun signals from at least one detector; commanding a display unit to communicate information on a display; and generating the information in response to detecting data within the one or more ATC light gun signals corresponding to visible light emitted in at least one predetermined frequency range. In some examples, the method further comprising providing a visual representation of the data that is detected to computer display that is viewable to a user in a cockpit of an aerial vehicle. The at least one predetermined frequency range comprises frequencies of red light, green light, and white light. The method further comprising determining a predetermined pattern in a series of time-related ATC light gun signals corresponding to one or more known ATC light gun signal patterns.

According to examples of the present disclosure, one or more high Q filters, such as all-zero filters or wavelets, can be used to distinguish at least three disparate light frequencies (or spectrum) produced by an ATC light gun to provide an indication of which color was transmitted. The output of the system can be an enumerated indication of which light is present. Additional features, such as light signal history can be incorporated and/or interpretation of the signals. For the white light produced by the ATC light gun, a wide-spectrum approach can be used. In one non-limiting example, the system can include a computer with a color input camera, a processor with software, and a visual display output. The software can be configured to process the input imaging data and produce a display output. The sensor output can be read by the computer which drives the display. A variety of filters can be used, including but not limited to, all-zero filters, narrowband filters, and wavelet filters that capture harmonics of the light and further enhance color identification. The comparison module is configured to spectrally analyze one or more characteristics of the one or more ATC light gun signals based on one or more known light characteristics produced by the ATC light gun. The one or more characteristics of the one or more ATC light gun signals is based on spectrum differences dues to distance, lighting conditions, atmospheric conditions, or combinations thereof. The spectrum characteristics can include frequency spectrum characteristics, central frequency characteristics, average intensity, and one or more variations of the above-noted characteristics.

BRIEF DESCRIPTION OF THE FIGURES

The accompanying drawings, which are incorporated in and constitute a part of this specification, illustrate embodiments of the present teachings and, together with the description, serve to explain the principles of the present teachings. In the figures:

FIG. 5 shows a second example of information to be displayed to a pilot according to examples of the present disclosure.

DETAILED DESCRIPTION

As discussed above, it would be desirable to have the widest possible pool of potential commercial and private pilots from which to draw. One issue standing the way of that is the FAA does not allow pilots who are even partially color-blind (i.e., those unable to distinguish white, red, and green lights) to fly at night or by light signal, essentially disqualifying them from being pilots. Accordingly, examples of the present disclosure provide for, among other things, systems, devices, and methods that are able to detect and determine the color and patterns of fixed and flashing lights received by ATC light source, such as but is not limited to an ATC light gun or similar type light signaling devices, by a detector located within or mounted to an external surface of an aerial vehicle. In some examples, the systems, the devices, and the methods can use either hardware- or software-based components to detect and determine the colors and patterns of colors. For example, in the hardware configuration, one or more filters can be used with the detector, including, but not limited to, one or more specialized high quality factor filters, such as all-zero filters or wavelet filters, or other similar functioning filters, that are able to distinguish white, red, and green light frequencies/spectrum, such that they can be used to present these analyzed light signals and an estimated sequence of the light signals to the pilot. The spectrum characteristics that can be used for the analysis can include one or more of the following: frequency spectrum characteristics, central frequency characteristics, average intensity, and one or more variations of the above-noted characteristics.

In use, examples of the present disclosure would detect and display information that is useable by the pilot regarding the light signals from the control tower. The output of the system is an enumerated indication of which light is present. An additional feature of a light signal history could be incorporated to store and display previous flashes and would allow for interpretation of signals—ala Morse Code—since there is a set of standard light signal communications for pilots that consists of short and long flashes of different color. Signals that do not fit a predetermined pattern may be rejected from the signal analysis.

In one non-limiting example, the system can include a computer with one or more optical sensors and/or one or more optical detectors, such but not limited to a color input camera, a processor with software capable of processing the input imaging and producing a display output, and a visual display to depict the output. A variety of filters can be used, including all-zero and narrowband; also, wavelet filters can be used to capture harmonics of the light and further enhance color identification.

Figure 1:
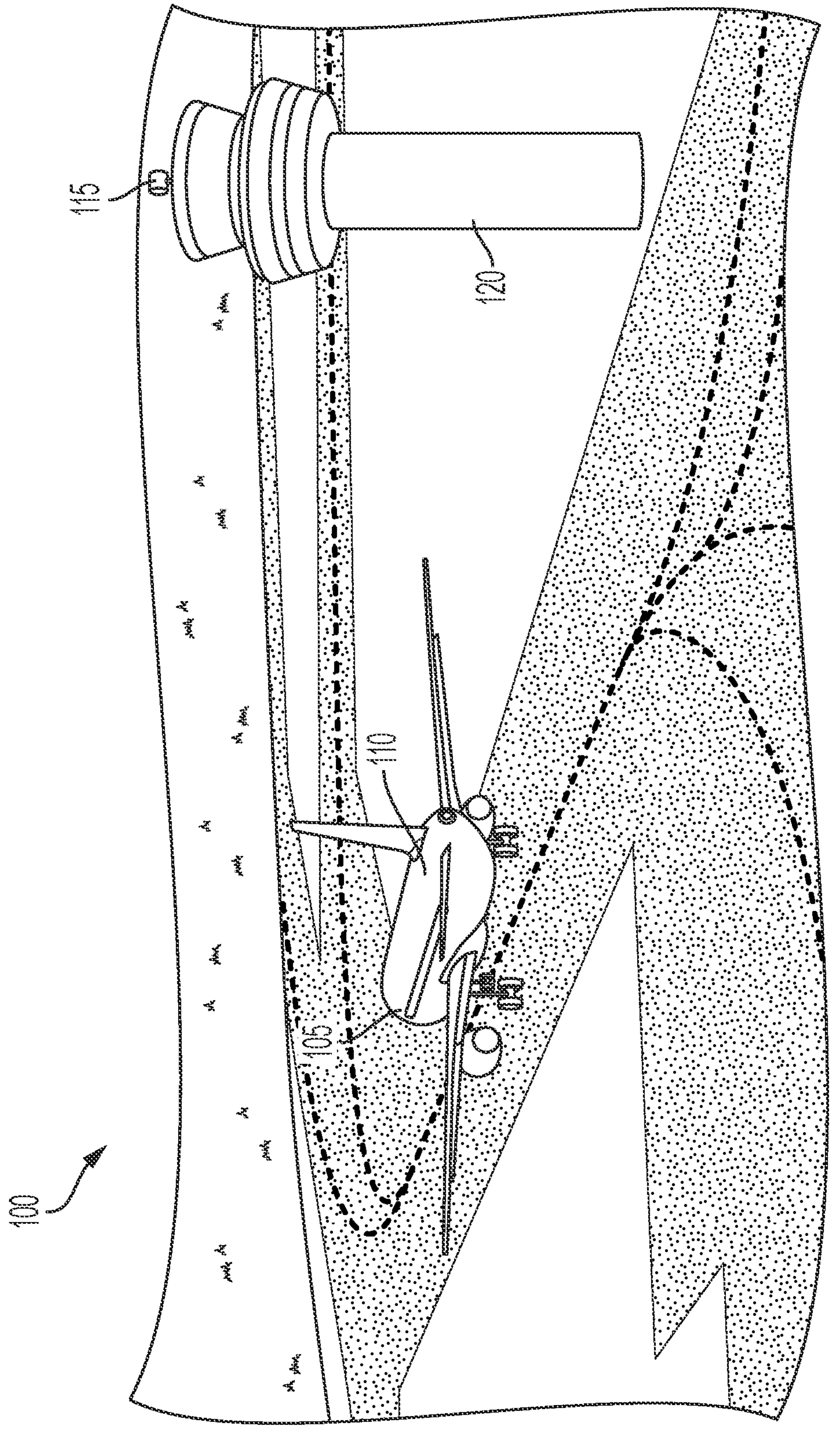
FIG. 1 schematically illustrates an aerial vehicle including a detection system according to examples of the present disclosure.
Figure 2:
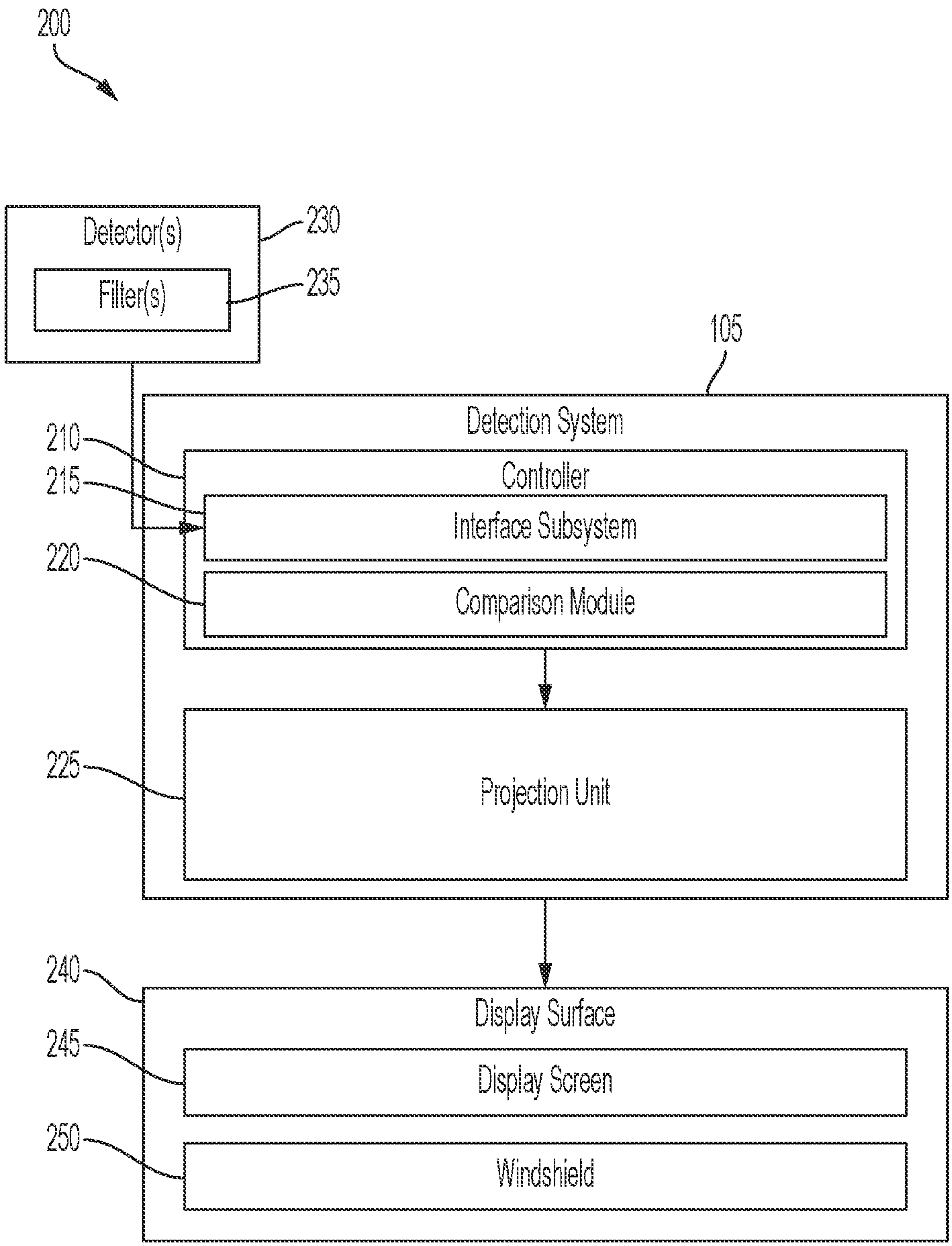
FIG. 2 is a schematic view of the detection system of FIG. 1.

FIG. 1 schematically illustrates an environment 100, such as an airport tarmac, for use of a detection system 105 for providing information to a pilot of an aerial vehicle 110 according to examples of the present disclosure. FIG. 2 is a schematic view 200 of the detection system of FIG. 1. The detection system 105 can be positioned, for example, within a cockpit of the aerial vehicle 110 or other locations of the aerial vehicle 110. The detection system 105 is operable to display information or content relating to a condition or operating state of an ATC light gun 115 located at the control center of an ATC tower 120, as discussed in detail below. The information may be presented in the form of one or more images or graphics to the pilot. For instance, the information can be provided in images or graphics indicating one or more conditions of the aerial vehicle 110. In other examples, the detection system 105 interfaces with a media device operable to provide and display content in the form of navigation data, imagery, radio data or a menu for interfacing with another system of the aerial vehicle 110, or even another system located remotely from the aerial vehicle 110. In other examples, the information relating to a condition or operating state of one or more objects is provided as a separate image, graphic, textual message or audible signal, for example. However, other techniques for presenting the information relating to a condition or operating state of the object of interest can be implementing based on the particular circumstances or operating environment of the detection system 105.

In some examples, the detection system 105 is integrated with an instrument cluster or panel oriented towards the pilot for presenting various information or content during operation of the aerial vehicle 110. In other examples, the detection system 105 can be integrated with a heads-up display unit (HUD) or similar type of display that is operable to project an image on a display surface 240, such as a display screen 245, to be observed by the pilot during operation of the aerial vehicle 110. In some examples, the display surface 240 is situated adjacent to the windshield 250 for projecting information onto the display screen 245. In other examples, the windshield 250 or another component of the vehicle 110 provides the display surface 240. Other arrangements of the heads-up display unit and the display surface 240 are contemplated.

The detection system 105 interfaces with one or more optical sensors and/or one or more optical detectors 230. Each of the one or more optical sensors and/or the one or more optical detectors 230 can be an analog or digital device operable to generate images. At least one of the one or more optical sensors and/or the one or more optical detectors 230 is arranged with respect to the aerial vehicle 110 such that the one or more optical sensors and/or the one or more optical detectors defines a field of view or a vector. In some examples, at least one of the one or more optical sensors and/or the one or more optical detectors 230 is arranged to orient the vector towards an expected position of an ATC light gun 115, such that the vector intersects the ATC light gun 115 when the ATC light gun 115 is present in the field of view of the one or more optical sensors and/or the one or more optical detectors 230. The ATC light gun 115 emits at least one ATC light gun signal which is observable by the at least one or more optical sensors and/or the one or more optical detectors 230.

In some examples, the detection system 105 is coupled, either wired or wirelessly, to another digital system on-board the aerial vehicle 110, such as an aerial vehicle controller or controller 210 operable to perform various system tasks. In other examples, the detection system 105 is a standalone device. The detection system 105 can be installed and/or configured during or after vehicle assembly.

In some examples, the detection system 105 includes a display surface 240. The projection unit 225 is operable to project an image or content on a display surface 240 that is located at a location that is observable by the pilot 14 or operator of the detection system 105 or to another display unit. In some examples, the display surface 240 is a separate structure providing a display screen 245 adjacent to the pilot, such as near a windshield 250 or at another location of the aerial vehicle 110. It should be appreciated that a suitable display surface 240 can be any surface for projecting the image and can be formed of any suitable material to allow for doing so.

The detection system 105 includes a controller 210 operable to generate the image. The controller 210 can be located within a housing of the projection unit 225, or another suitable location. The controller 210 is electrically coupled, either wired or wirelessly, to the projection unit 225 to command the projection unit 225 to project the image or other information onto the display surface 240. In further examples, the controller 210 augments the image to include other content provided by another system, including the aerial vehicle controller 210.

As illustrated in FIG. 2, the controller 210 includes one or more subsystems to detect a condition or state of ATC light gun signals detected during operation of the detection system 105. These subsystems can be implemented by hardware and/or software depending on the particular circumstances. The controller 210 includes an interface subsystem 215 in communication with at least one or more optical sensors and/or one or more optical detectors 230. The one or more optical sensors and/or one or more optical detectors 230 is operable to provide an image and/or signal to the controller 210 at the interface subsystem 215.

In some examples, the controller 210 can include a comparison module 220 to evaluate each image or signal captured and/or detected and/or provided by the one or more optical sensors and/or the one or more optical detectors 230. In some examples, the controller 210 is programmed with at least one filtering and/or spectrum identifying algorithm or library to isolate data within the color signal in at least one predetermined frequency or frequency range. The one filtering and/or spectrum identifying algorithm or library can be preloaded or remotely installed and updated with one or more predetermined characteristic color identifying criterion, such as but are not limited to, a wavelength, a range of wavelengths, a frequency, or a range of frequencies. The predetermined characteristic color identifying criterion can be based on a color received over a variety of distances and/or a variety of atmospheric conditions, such that light emitted by the ATC light gun may deviate in condition one or more ways as the light travels over different distances and through different atmospheric conditions (such as weather-related conditions including rain, snow, fog) and/or sun-light conditions (such as direct sun light or indirect sun light). The filtering algorithm includes one or more low-pass filters, high-pass filters, and band-pass filters, for example, although other filtering techniques are contemplated. The at least one predetermined frequency range corresponds to light signals and/or patterns of light signals emitted by an ATC light gun at the at least one predetermined frequency range. For instance, the ATC light gun can emit light which is observed by the pilot and other occupants of the cockpit, such as white, red, and green light. The filtering algorithm may be able to filter out other waveforms emitted by other objects or other colors (e.g., blue) that are not used in ATC light gun signaling, encountered by the aerial vehicle 110 which are not associated with the frequency of interest.

The controller 210 can also be programmed with at least one color recognition algorithm or library operable to detect and/or determine the color(s) within each image generated and provided by each of the one or more optical sensors and/or the one or more optical detectors 230. In some examples, the algorithm is an edge detection or pattern recognition algorithm. These libraries, for example, allow the controller 210 to detect one or more geometric features within the image provided by the one or more optical sensors and/or the one or more optical detectors 230.

In some examples, the one or more optical sensors and/or the one or more optical detectors 230 can include one or more color sensors that can detect received light intensity for red, blue, and green, respectively. The received light intensity of red, blue and green can be detected, and the ratio of light received is calculated. By calculating the ratio of the intensity of the red, green, and blue light received, it is possible to distinguish differences in the color or appearance of the object. The color sensor can include one or more photodiodes that are sensitive to light and convert the incoming light into an electric current. There can be one or more photodiodes in a color sensor, each one covered with a different color filter (red, green, and blue), and one or more analog-to-digital converters (ADC) that converts the analog signals from the photodiodes into digital values, which can then be processed and interpreted. The color sensor can be a true color sensor or a light-to-frequency converter. True color sensors use three separate light receivers to perceive red, green, and blue light. This type of sensor emulates the human eye's perception of color, providing accurate and reliable color detection. Color sensors that use light-to-frequency converters measure the intensity of light and convert it into a frequency output.

In some examples, the one or more optical sensors and/or the one or more optical detectors 230 can include one or more filters 235. The one or more filters 235 can include high Q filters, such as all-zero filters or wavelets, or other types of filters that are able to distinguish these three disparate light frequencies (or spectrum) so pilots could properly perceive the light signal colors. In some examples, the ATC light gun signals can be enhanced and intensified for the pilot in command. The output of the system can be both a visually-enhanced view of the light signals, as well as an enumerated indication of which light is present. Additional features, such as light signal history could be incorporated, perhaps even interpretation of signals. In some examples, these features of the one or more filters 235 can be performed in software in the controller system 210 or comparison module 220.

The controller 210 is operable to command or otherwise instruct the projection unit 225 to project information onto the display surface 240. In other examples, the controller 210 is operable to command an instrumentation panel to present the information in response to detecting the light from the ATC light gun 115. In yet other examples, the controller 210 is operable to command another display device to present the information to the pilot or other cockpit occupants. Of course, there are other ways the controller 210 can present the information to the pilot, such as by providing a signal to a warning light, digital or analog gauge, or audible device. In further examples, the controller 210 reports a state of the ATC light gun signal to the pilot or other cockpit occupant as part of the instrumentation, such as the heads-up display unit, by text, and/or other methods that do not depend on color in order to inform the pilot or other cockpit occupant of the state of the ATC light gun signal. For example, the controller 210 can generate images including the information as a textual message or word, such as white, green, or red, within the instrumentation of the aerial vehicle 110. In another example, the controller 210 provides a signal to the instrumentation of the aerial vehicle 110, such as an audible device, corresponding to a state of the ATC light gun signal.

The controller 210 can include a processor, a memory and an interface. The processor may, for example only, be any type of known microprocessor having desired performance characteristics. The memory may, for example only, includes UVPROM, EEPROM, FLASH, RAM, ROM, DVD, CD, a hard drive, or other computer readable medium which may store data and the detection algorithm, such as described and shown in FIG. 3, for operation of the detection system 105 as described herein. The interface facilitates communication with the other systems or components of the aerial vehicle 110. In some examples, the controller 210 may be a portion of the vehicle control, another system, or a stand-alone system.

Figure 3:
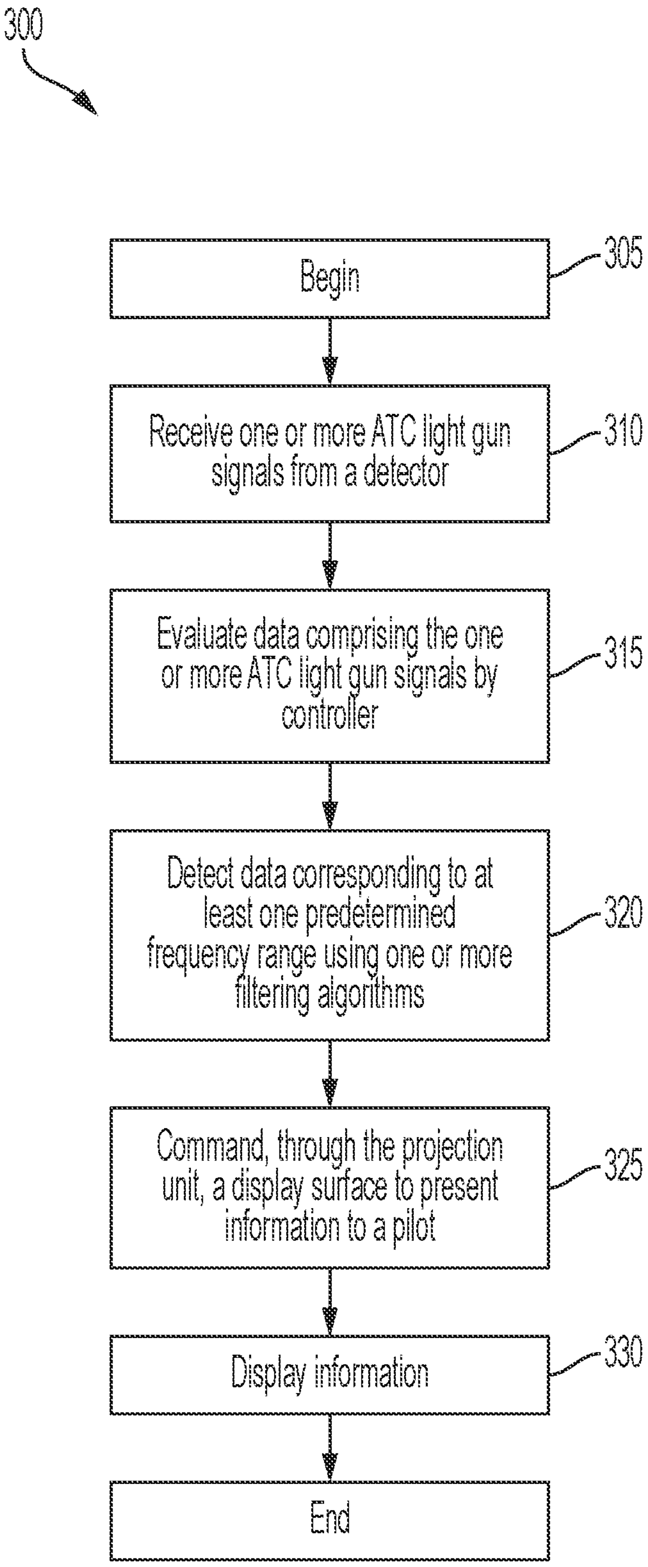
FIG. 3 is a flowchart of a detection algorithm for a detection system according to examples of the present disclosure.

With reference to FIG. 3, operation of a detection system 105 is performed through a detection algorithm 300 which is operable to detect the ATC light gun signal and an operating state or condition thereof, based on images provided by the one or more optical sensors and/or one or more optical detectors 230 and/or data from other sensors. The functions of the detection algorithm 300 are disclosed in terms of functional blocks. It should be understood by those skilled in the art with the benefit of this disclosure, that these functions may be enacted in either dedicated hardware circuitry or program software capable of execution in a microprocessor-based electronics-controlled embodiment, such as a controller 210, or a combination thereof. In other examples, the detection algorithm can be implemented at least in part by one or more analog devices. Other implementations of the detection algorithm 300 are contemplated, including another system or devices than the detection system 105 as situated in the vehicle 110. Operation of the detection algorithm 300, as executed by the controller 210, will be discussed for purposes of illustration below and should not be construed to be limiting.

Upon system initialization at block 305, the algorithm 300 then moves to a ready state, and receives at least one signal from the one or more optical sensors and/or the one or more optical detectors 230 at block 310. At block 315, the controller 210 evaluates data comprising the image. The controller 210 implements one or more filtering algorithms at block 320 to detect or otherwise determine whether the data corresponds to at least one predetermined frequency range. In some examples, the controller 210 may execute at least one color recognition algorithm at block 320 to detect one or more ATC light gun signals within the image associated with an object profile. In further examples, the controller 210 determines whether or not the one or more ATC light gun signals within the image is associated with the predetermined frequency range. It should be appreciated that blocks 310, 315 can be executed in either order depending on a particular situation.

At block 325, the controller 210 commands, through the projection unit 225, a display surface 240, such as the display screen 245, a heads-up display unit, an instrument panel, or another display device, to present information to a pilot or other cockpit occupant if the controller 210 determines that the data corresponds to a waveform emitted at the predetermined frequency range. The information to be presented to the pilot is selected to characterize an aspect of the ATC light gun signal, such as an operational state, condition or presence of the ATC light gun signal. For example, the information may indicate whether an ATC light gun signal is white, red, or green, and a pattern of the ATC light gun signal.

In some examples, the controller 210 is configured to store one or more past ATC light gun signals and/or pattern of signals that may be provided to the pilot or other cockpit occupant on the display unit to provide a historical record of recent ATC light gun signals of reference by the pilot or other cockpit occupant.

At block 330, the information is displayed or otherwise provided to the pilot or others in the cockpit in response to detecting data associated with the at least one predetermined frequency. In some examples, a projection unit 225 receives a command from the controller 210 to display the information, and projects the information onto a display surface 240. In other examples, the information is provided at other locations of the aerial vehicle 110, including the instrumentation panel and/or one or more other devices. Of course, other techniques for presenting information to the pilot are contemplated within the teachings of this disclosure. The algorithm 300 repeats any or all of the blocks 305-330 until execution of the algorithm terminates at step 330.

Figure 4:
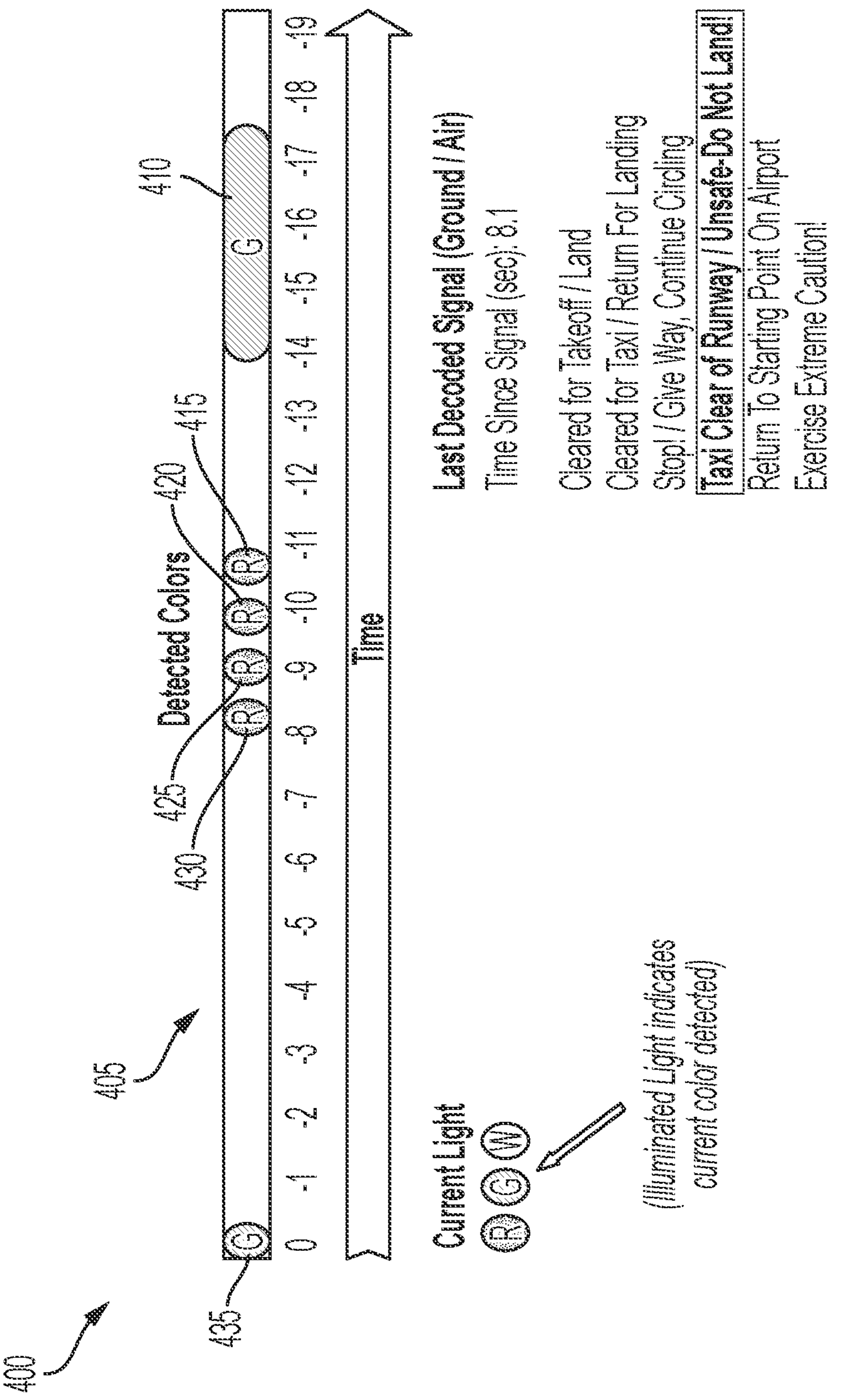
FIG. 4 shows a first example of information to be displayed to a pilot according to examples of the present disclosure.

FIG. 4 shows a first example of information 400 to be displayed to a pilot on a display screen 240 according to examples of the present disclosure. As shown in FIG. 4, the information 400 is displayed on the display screen 240 as a strip chart 405 with the colors being displayed as they come in and scrolling left to right. In this example, the long green light pulse 410 came in quite a while ago (which would have been decoded as stead green), followed by four red pulses 415, 420, 425, 430. The next ATC light gun signal that is received is a single green pulse 435. As can be seen, using the legend on the right, the last decoded signal was flashing red (the four red pulses) 415, 420, 425, 430, as the green pulse 435 alone does not indicate a signal yet.

FIG. 5 shows a first example of information to be displayed to a pilot according to examples of the present disclosure. Once a current ATC light gun signal is received and decoded, a particular row in the chart shown in FIG. 5 can be indicated as correct, such as by illuminating the correct row.

Figure 6:
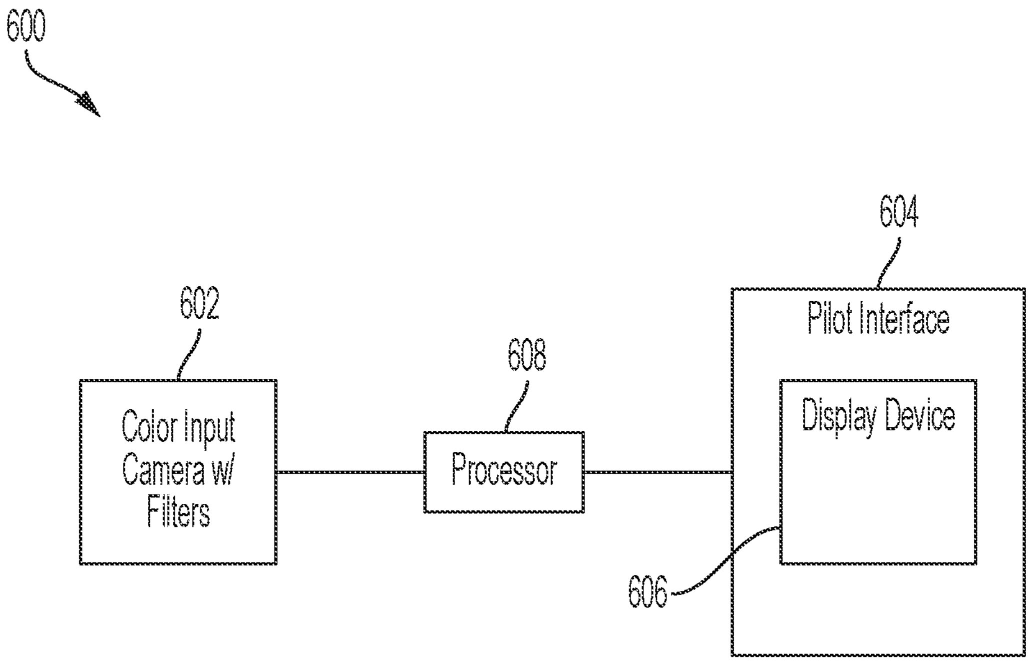
FIG. 6 shows a block diagram of another detection system according to examples of the present disclosure.

FIG. 6 shows a block diagram of another detection system 600 according to examples of the present disclosure. The detection system 600 comprises a processor 608 that is electrically and communicatively coupled with a detector, such as a color input camera with one or more filters 602, as discussed above, and with a pilot interface 604. The color input camera with the one or more filters 602 can be configured to function as the detector(s) 230 and filter(s) 235 as discussed above. The pilot interface 604 includes a display device 606 that is configured to present information based on the one or more ATC light gun signals that are received and processed by the color input camera with the one or more filters 602. The display 606 can be configured in a similar manner as the display surface 240, the display screen 245, or the windshield 250.

Although the different examples have a specific component shown in the illustrations, embodiments of this disclosure are not limited to those particular combinations. It is possible to use some of the components or features from one of the examples in combination with features or components from another one of the examples. Also, although particular step sequences are shown, described, it should be understood that steps may be performed in any order, separated, or combined unless otherwise indicated and will still benefit from the present disclosure.

Examples of the present disclosure include one or more of the following clauses.

Clause 1. A detection system for detecting one or more air traffic control (ATC) light gun signals produced by an ATC light gun, the detection system comprising:

- an interface subsystem operable to receive one or more ATC light gun signals from at least one detector;
- a controller operable to command a display unit to communicate information on a display; and
- a comparison module operable to generate the information in response to detecting data within the one or more ATC light gun signals corresponding to visible light emitted in at least one predetermined frequency range.

Clause 2. The detection system of clause 1, further comprising a projection subsystem configured to interface with the controller and with a display surface to provide a visual representation of the data that is detected to computer display that is viewable to a user in a cockpit of an aerial vehicle.

Clause 3. The detection system of clause 1 or clause 2, wherein the at least one predetermined frequency range comprises frequencies of red light, green light, and white light.

Clause 4. The detection system of any of clauses 1-3, wherein the comparison module is operable to determine a predetermined pattern in a series of time-related ATC light gun signals corresponding to one or more known ATC light gun signal patterns.

Clause 5. The detection system of any of clauses 1-4, wherein the one or more known ATC light gun patterns comprise a steady red light pattern, a flashing red light pattern, a steady green light pattern, an alternating red light and green light pattern, and a white light pattern.

Clause 6. The detection system of any of clauses 1-5, wherein the one or more ATC light gun signals received by interface subsystem is filtered using one or more filters.

Clause 7. The detection system of any of clauses 1-6, wherein the interface subsystem or the comparison module comprises one or more filtering algorithms to filter the one or more ATC light gun signals.

Clause 8. The detection system of any of clauses 1-7, wherein the comparison module is configured to spectrally analyze one or more characteristics of the one or more ATC light gun signals based on one or more known light characteristics produced by the ATC light gun.

Clause 9. The detection system of any of clauses 1-8, wherein the one or more characteristics of the one or more ATC light gun signals is based on spectrum differences dues to distance, lighting conditions, atmospheric conditions, or combinations thereof.

Clause 10. A method for detecting one or more air traffic control (ATC) light gun signals produced by an ATC light gun, the method comprising:

- receiving, by an interface subsystem of a detector system, one or more ATC light gun signals from at least one detector;
- commanding, by a controller of the detector system, a display unit to communicate information on a display; and
- generating, by a comparison module of the detector system, the information in response to detecting data within the one or more ATC light gun signals corresponding to visible light emitted in at least one predetermined frequency range.

Clauses 11. The method of clause 10, further comprising providing, by a projection subsystem that is configured to interface with the controller and with a display surface, a visual representation of the data that is detected to computer display that is viewable to a user in a cockpit of an aerial vehicle.

Clause 12. The method of clause 10 or clause 11, wherein the at least one predetermined frequency range comprises frequencies of red light, green light, and white light.

Clause 13. The method of any of clauses 10-12, further comprising determining, by the comparison module, a predetermined pattern in a series of time-related ATC light gun signals corresponding to one or more known ATC light gun signal patterns.

Clause 14. The method of any of clauses 10-13, wherein the one or more known ATC light gun patterns comprise a steady red light pattern, a flashing red light pattern, a steady green light pattern, an alternating red light and green light pattern, and a white light pattern.

Clause 15. The method of any of clauses 10-14, wherein the one or more ATC light gun signals received by interface subsystem is filtered using one or more filters.

Clause 16. The method of any of clauses 10-15, wherein the interface subsystem or the comparison module comprises one or more filtering algorithms to filter the one or more ATC light gun signals.

Clause 17. A non-transitory computer readable medium that stores instructions that when executed by a hardware processor performs a method for detecting one or more air traffic control (ATC) light gun signals produced by an ATC light gun, the method comprising:

- receiving one or more ATC light gun signals from at least one detector;
- commanding a display unit to communicate information on a display; and
- generating the information in response to detecting data within the one or more ATC light gun signals corresponding to visible light emitted in at least one predetermined frequency range.

Clause 18. The non-transitory computer readable medium of clause 17, wherein the method further comprising providing a visual representation of the data that is detected to computer display that is viewable to a user in a cockpit of an aerial vehicle.

Clause 19. The non-transitory computer readable medium of clause 17 or clause 18, wherein the at least one predetermined frequency range comprises frequencies of red light, green light, and white light.

Clause 20. The non-transitory computer readable medium of any of clauses 17-19, the method further comprising determining a predetermined pattern in a series of time-related ATC light gun signals corresponding to one or more known ATC light gun signal patterns. The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. Moreover, the order in which the elements of the methods are illustrated and described may be rearranged, and/or two or more elements may occur simultaneously. The embodiments were chosen and described in order to best explain the principles of the invention and its practical applications, to thereby enable others skilled in the art to best utilize the invention and various embodiments with various modifications as are suited to the particular use contemplated.

What is claimed is:

1. A detection system for detecting one or more air traffic control (ATC) light gun signals produced by an ATC light gun, the detection system comprising:

- an interface subsystem operable to receive one or more ATC light gun signals from at least one detector;
- a controller operable to command a display unit to communicate information on a display; and
- a comparison module operable to generate the information in response to detecting data within the one or more ATC light gun signals corresponding to visible light emitted in at least one predetermined frequency range,
- wherein the information comprises an operational state, a condition, or a presence of the one or more ATC light gun signals, and
- wherein the comparison module is operable to determine a predetermined pattern in a series of time-related ATC light gun signals corresponding to one or more known ATC light gun signal patterns.

2. The detection system of claim 1, further comprising a projection subsystem configured to interface with the controller and with a display surface to provide a visual representation of the data that is detected to computer display that is viewable to a user in a cockpit of an aerial vehicle.

3. The detection system of claim 1, wherein the at least one predetermined frequency range comprises frequencies of red light, green light, and white light.

4. The detection system of claim 1, wherein the one or more known ATC light gun patterns comprise a steady red light pattern, a flashing red light pattern, a steady green light pattern, an alternating red light and green light pattern, and a white light pattern.

5. The detection system of claim 1, wherein the one or more ATC light gun signals received by interface subsystem is filtered using one or more filters.

6. The detection system of claim 1, wherein the interface subsystem or the comparison module comprises one or more filtering algorithms to filter the one or more ATC light gun signals.

7. The detection system of claim 1, wherein the comparison module is configured to spectrally analyze one or more characteristics of the one or more ATC light gun signals based on one or more known light characteristics produced by the ATC light gun.

8. The detection system of claim 7, wherein the one or more characteristics of the one or more ATC light gun signals is based on spectrum differences dues to distance, lighting conditions, atmospheric conditions, or combinations thereof.

9. The detection system of claim 1, wherein the predetermined pattern comprises a series of fixed and flashing colors lights received by the ATC light gun.

10. A method for detecting one or more air traffic control (ATC) light gun signals produced by an ATC light gun, the method comprising:

receiving, by an interface subsystem of a detector system, one or more ATC light gun signals from at least one detector;

commanding, by a controller of the detector system, a display unit to communicate information on a display;

determining, by a comparison module, a predetermined pattern in a series of time-related ATC light gun signals corresponding to one or more known ATC light gun signal patterns; and generating, by the comparison module of the detector system, the information in response to detecting data and determining the pattern within the one or more ATC light gun signals corresponding to visible light emitted in at least one predetermined frequency range, wherein the information comprises an operational state, a condition, or a presence of the one or more ATC light gun signals.

11. The method of claim 10, further comprising providing, by a projection subsystem that is configured to interface with the controller and with a display surface, a visual representation of the data that is detected to computer display that is viewable to a user in a cockpit of an aerial vehicle.

12. The method of claim 10, wherein the at least one predetermined frequency range comprises frequencies of red light, green light, and white light.

13. The method of claim 10, wherein the one or more known ATC light gun patterns comprise a steady red light pattern, a flashing red light pattern, a steady green light pattern, an alternating red light and green light pattern, and a white light pattern.

14. The method of claim 10, wherein the one or more ATC light gun signals received by interface subsystem is filtered using one or more filters.

15. The method of claim 10, wherein the interface subsystem or the comparison module comprises one or more filtering algorithms to filter the one or more ATC light gun signals.

16. The method of claim 10, wherein the predetermined pattern comprises a series of fixed and flashing colors lights received by the ATC light gun.

17. A non-transitory computer readable medium that stores instructions that when executed by a hardware processor performs a method for detecting one or more air traffic control (ATC) light gun signals produced by an ATC light gun, the method comprising:

receiving one or more ATC light gun signals from at least one detector;

commanding a display unit to communicate information on a display;

determining a predetermined pattern in a series of time-related ATC light gun signals corresponding to one or more known ATC light gun signal patterns; and generating the information in response to detecting data and determining the pattern within the one or more ATC light gun signals corresponding to visible light emitted in at least one predetermined frequency range, wherein the information comprises an operational state, a condition, or a presence of the one or more ATC light gun signals.

18. The non-transitory computer readable medium of claim 17, wherein the method further comprising providing a visual representation of the data that is detected to computer display that is viewable to a user in a cockpit of an aerial vehicle.

19. The non-transitory computer readable medium of claim 17, wherein the at least one predetermined frequency range comprises frequencies of red light, green light, and white light.

20. The non-transitory computer readable medium of claim 17, wherein the predetermined pattern comprises a series of fixed and flashing colors lights received by the ATC light gun.

* * * * *